United States Patent Office 3,188,521
Patented June 8, 1965

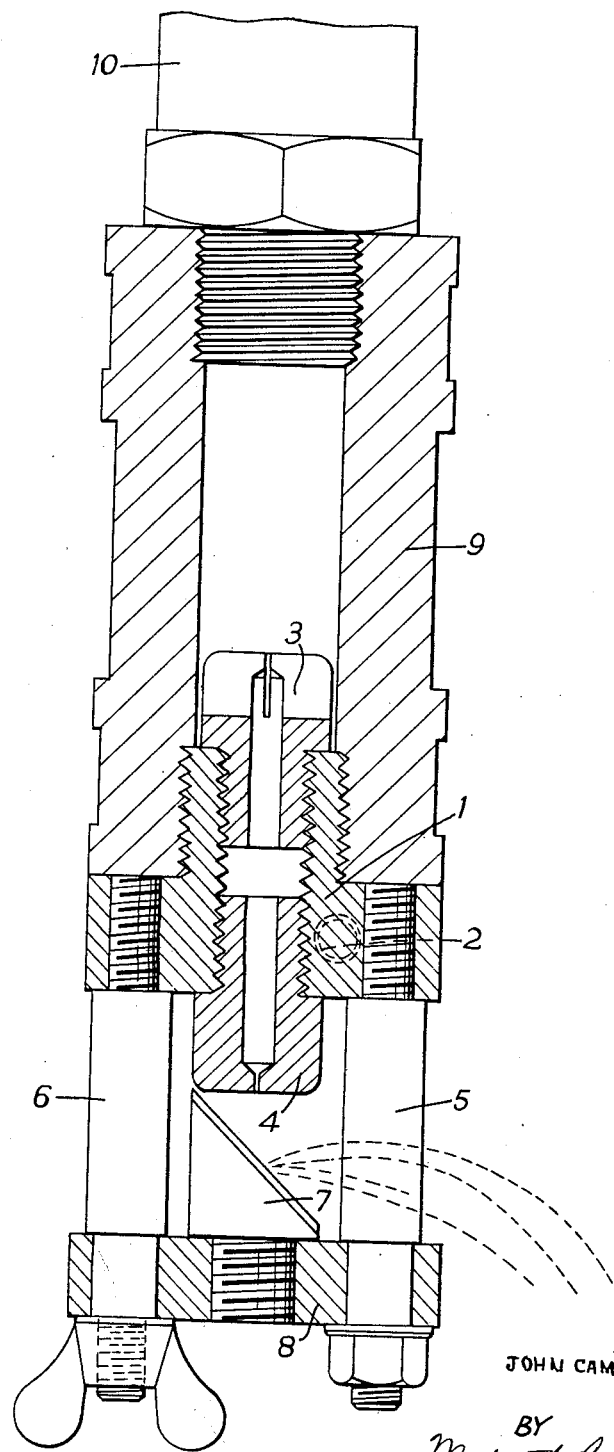

3,188,521
PROTECTION OF BEARINGS
John Campbell Hart, Fetcham, England, assignor to The Hoyt Metal Company of Great Britain Limited, London, England, a British company
Filed Mar. 1, 1961, Ser. No. 92,635
4 Claims. (Cl. 317—2)

The present invention relates to the protection of bearings against hitherto unexplained breakdowns.

It has now been discovered that much hitherto unexplained damage has been caused by electro-chemical attack due to the discharge of charged particulate contaminants present in lubricants or liquid fuels.

Modern engineering practice makes use of constantly increasing speeds in bearings of all kinds including plain, ball and roller bearings and gas bearings. Liquids and gases used as lubricants are also caused to move at greater velocities within the bearings than was the case in the past, and as a result charged lubricant particles have a greater tendency to impinge on metal surfaces and thus set up electro-chemical attack. Typical contaminants are minute particles or globules of water and fine dispersions of metals, metallic oxides, carbon, sulphur, dust and the like, and the charge on such particles is ordinarily preserved by the dielectric properties of the lubricant liquid or gas.

Depending on the number of particles charged positively and negatively and the velocity of gas or liquid through a conductive duct or tube at any given point, an electric current will flow in the walls of the duct or tube. The current depends largely on the contact between the particles and the wall of the tube or duct and may set up electro-chemical reactions which may promote serious forms of corrosion in bearings.

As long as lubricating oil is moving relatively slowly the current generated is very small. This normally takes place in tubes conveying the lubricating oil to the bearings. When the oil enters bearings, it immediately undergoes a great increase in velocity, both linear and angular so that the flow becomes turbulent. This greatly increases the rate of impingement of the particles on the metallic surfaces in the bearings and the current increases substantially to a point where it can promote electro-chemical reactions which damage the bearings.

Damage arises instantaneously from electrolysis of the traces of moisture present in lubricating oil into nascent hydrogen and oxygen and the active oxygen attacks the metal surfaces of the bearings. The moisture in the oil tends to be concentrated against the lining in plain bearings by centrifugal force. This force may be very great when the oil undergoes effluxion from the area of minimum clearance at high pressure into the expanding clearance in the bearing. It is a feature of the reaction that the oxygen is in close contact with the metal surface and is mainly in the form of minute bubbles. The gas penetrates into the surface in such a manner that it escapes contact with the lubricating oil on one face. It is therefore not possible for the oil to absorb the oxygen even when the oil is specially treated with additives which are designed to attract and absorb the oxygen. Where there are minute surface imperfections the oxygen rapidly enters these and cannot be reached by the oil.

It is known that when a molecule of metal reacts with one or more atoms of oxygen the resulting volume of the oxide is slightly greater than the volume of the metal before it is oxidised. In this way it is possible for the increased volume to set up intense local stresses, and these may cause a soft material such as a tin base bearing alloy to yield. The crack then extends through a few small crystals exposing clear metal surfaces which are again immediately attacked by the oxygen present. It is in this way that white metal can become cracked even when no stress is applied to it. Where stresses are applied, such as in engine bearings, the process advances more rapidly. The oxygen may enter the spaces between fitting metal surfaces and cause corrosion there also.

This applies particularly to the backs of bearing shells in their housings.

The cracks may be radial or may take a laminar form which is within the thickness of the white metal. Sometimes the laminar cracks break out into the surface of the white metal and sometimes they do not behave in this way. Where signs of cracking are absent at the surface, another form is the appearance of blisters where oxygen has been able to penetrate below the surface of the white metal.

In a plain bearing lined with any usual bearing alloy there is an area of minimum running clearance. As the shaft revolves, the oil leaves the area of minimum running clearance, where it can be under high pressure, and enters a portion of the clearance which is expanding. The result is that the oil accelerates into the greater volume and may become discontinuous. The acceleration and the break-up of the oil film releases a small additional amount of electricity which may set up localised electro-chemical corrosion through the reaction described. Where cracking has occurred due to this cause, the cracked walls are usually dark in colour and they are coated with a film of stannous oxide. This appearance makes it possible to distinguish cracks which have formed in the manner described from those which have occurred through mechanical stresses. In this way the walls of the crack present an appearance of clean fractures with no oxide film.

A slow release of oxygen tends to promote the formation of a hard scale of stannous oxide on tin base bearings. This scale may take over one year, or even three years before it becomes of critical thickness and builds up in the running clearance. More rapid release of oxygen tends to promote cracking, which has also been described, and this may occur in conjunction with scale formation. The hard scale may break away from the surface and become reduced to powder. This powder contaminates the lubricating oil and makes it dangerous.

The most rapid form of attack results in a large number of very small cracks developing in a matter of a few weeks. These break up the surface of the metal into particles and when the particles escape into the running clearance they tend to accumulate in a typical form of "wiping." The space from which the particles have been removed becomes a groove and the oil in entering this may become atomised or discontinuous, and in this way the attack is maintained and tends to extend the length of the groove in a circumferential direction. In this type of attack it is also possible for the steel shaft to be damaged and the damage takes the form of a groove which may be completely peripheral extending round the circumference. Turbine shafts running at high speeds are most likely to be damaged in this way.

The oxygen is liberated at anodic surfaces and the hydrogen is liberated at cathodic surfaces. Most of the oxygen is absorbed in the oil or combines with the metal. The hydrogen however remains free in the form of minute bubbles. These impart elasticity to the oil and their presence impairs the ability of the oil to form a good hydraulic film. In cases where shafts undergo some dynamic instability, the elasticity of the oil tends to encourage vibration rather than damp this out. Where the natural period of the vibration coincides with the elasticity, resonance is set up and severe hammering may occur within the bearing clearance.

It has been noted that bearings which suffer electrochemical corrosion in the bore also show signs of corrosion on the backs. New bearings which have a clean surface on the steel composing the shells are liable to be attacked in service. Bearings which have been relined have been subjected to considerable heat in the process, and this oxidises the steel surfaces. These oxidised steel surfaces are considerably more resistant to corrosion than the clean steel, and this in turn restricts the electro-chemical corrosion in the bore through the possible path of the current being broken by the insulation properties of the oxide layer on the steel. It is a convenient practice to oxidise or treat the steel surfaces to provide these with an insulated layer of no measurable thickness, but which is effective in preventing the very small currents from flowing.

There are two main sources of charged particles, the discharge of which gives rise to the electrical currents, which are believed to cause the above-described damage to bearings. These are respectively the lubricating oil, the charged particles from which set up electrolytic action directly within the bearings, and fuel oil, charged particles from which impinge on metallic surfaces during injection through atomisers in internal combustion engines and during injection through burner nozzles in boiler equipment to set up electric currents, which produce electro-chemical damage when they cross bearings. A particular example of the latter is damage to the main bearings of a ship's propeller shaft owing to the tendency of stray currents in ship structures to pass down the propeller shaft into the sea.

According to the present invention a method of protecting bearings from electro-chemical attack resulting from the discharge of charged particulate contaminants in dielectric fluids, such as lubricants and liquid fuels, comprises discharging the charge on such contaminants in a zone remote from the bearings and, if necessary, providing a low resistance discharge path to ground for the resultant electrical current.

The charges on particulate contaminants in lubricants discharge direct onto the bearing surfaces and the preferred way to deal with problems arising from lubricating oils is to discharge the oil before it is supplied to the machinery, although a device may be incorporated in the lubricating system for the continuous discharge of charged particles in the lubricant.

The charges on particulate contaminants in fuel oils ordinarily discharge in the nozzles of the injectors or burners, which are of course remote from the bearings, and the resultant current is conducted to ground by providing low resistance conductors in parallel with the leakage path through the bearings to ground. Because of the large quantities involved, it is not readily practicable to discharge fuel oils before it is fed to injectors or burners; it is, however, readily practicable to lead away to ground the current resulting from the discharge of particles at the nozzles without crossing engine bearings or the bearings of associated machinery.

According to one aspect of the invention there is provided a method for decharging the charges on contaminants in liquids having dielectric properties, particularly lubricating oils. Once lubricating oil has been decharged by the method of the present invention it should not require further treatment for the whole of its service life, which in the case of the lubricant used in large turbines may be many thousands of hours.

A preferred method for reducing or removing the electric potential from contaminant particles is to force lubricant at high speed through a small orifice. After the oil leaves the orifice it impinges on an inclined metal surface to impart a high angular velocity to the oil. In such apparatus the lubricant should be subjected to higher linear and angular speeds than it will meet in bearings in service.

In the accompanying drawing there is shown a vertical section of an apparatus constructed for decharging liquids.

The apparatus, which is constructed of bronze to avoid it becoming corroded, comprises a base 1, which carries a terminal screw 2 for connecting a low resistance ground conductor. A filter 3 is inserted at the inlet end of the bore through the base 1, at the outlet end of which a nozzle 4 is located. When small quantities of oil are being treated the orifice in the nozzle 4 is circular, and larger quantities may be passed by making the orifice into a slot. Also attached to the base are two pillars 5 and 6. One of these acts as a pivot for a support plate 8, and the other is fitted with a wing nut to act as a latch. A metal block 7 is secured in the plate 8 and has an inclined end surface on which the oil stream, issuing from the nozzle 4, impinges at high speed. When the apparatus is used to decharge lubricating oil, the block 8 is grounded. The metal block 7 tends to become corroded, but since it is studded into the plate 8 it can readily be removed and replaced. It is preferably faced with a metal such as tin.

When large quantities of oil are being treated to remove or reduce the charge or corrosion potential of the oil, the bases 1 of a number of units are threaded into a common high pressure connector 9 and oil is delivered through a high pressure hose 10 by means of a pump capable of developing the necessary pressure.

Other types of apparatus may be used to subject oil to the high linear and angular velocities which, according to the invention, are required for decharging oil. It has been found that oil must be passed through the apparatus a considerable number of times before the charge which causes corrosion potential is practically removed. Conditions in engine bearings are reproduced in that the oil passes through the bearings a large number of times. When the oil is new and carries a corrosion potential, it tends to release this, causing damage.

In one example the following factors applied:

The diameter of circular orifice _____ .500 mm.
Angle of slope of metal block face _____ 45°.
Metal used for block face _____ Pure tin.

Times to pass one litre and the corresponding velocities at the nozzle were as follows:

| Seconds for One litre discharged | Supply Pressure of Oil in Atm. | Velocity at nozzle in metres per minute |
| --- | --- | --- |
| 90 | 30 | 3,280 |
| 60 | 55 | 4,930 |
| 30 | 115 | 9,860 |

The viscosity of the oil is a variable which is controlled to a standard by temperature adjustments. Rapid results are obtained when the oil is subjected to the highest velocities. Some 20 litres of an oil carrying a significant corrosion potential will mark the tin surface over several square millimetres and remove or pit the tin to a depth which is easily measured on a surface-finish comparator. A safe oil lightly marks the surface of the tin and causes no pitting. Oil undergoing the process is recirculated through the apparatus until a sample shows it to be reasonably safe on a tin-faced block. The conditions of the process are adjusted to exceed substantially the conditions the oil will encounter in service. The centrifugal force at the block face is much in excess of that encountered when the oil is in use.

When bulk quantities of oil are being treated there may be any number of blocks and these may be faced with a metal which resists attack. Chromium, nickel or precious metal, or an alloy thereof, may be used. The tin-faced blocks are then used as controls to indicate completion of decharging.

It will be appreciated that the apparatus may be used as a test apparatus to check on the corrosion potential, i.e. the tendency to corrode by electro-chemical attack, of a given sample of a lubricant or fuel, by measuring the attack produced on a tin-faced block, used as a test piece.

Although it is preferred to decharge lubricants before supply to an engine or other machine, it may be desirable to fit a device of the type above described into the lubricating circuit of a machine.

In such case the current created in the apparatus is removed by a low resistance conductor which is in good electrical contact with the body of the apparatus. The other end of the conductor is taken to ground in the case of a machine used on land. In the case of ships the conductor allows the current to escape into the sea by any means. The current may be absorbed in electrolytic cells connected with the conductors. These cells limit the current flowing to ground or into the sea. The cells are expendable or may be discharged in any convenient manner to avoid electro-chemical attack on metal components.

The apparatus is completely insulated electrically except for the conductor already referred to. The incoming and outgoing tubes from the pump may contain lengths of nonmetallic material adjacent to the apparatus. The body is secured to its supports with insulation between the holding straps and the base. The insulation prevents stray electricity from entering or crossing the apparatus.

A further application is on vehicles serving oil to aircraft and on such vehicles the conductor must terminate in a good ground connection. In ships the apparatus may treat all lubricating oil periodically or continually and the storage tanks for the treated oil are insulated electrically from the hull.

A further application is to the protection of bearings which depend on a compressed gas for the lubricant. This gas may be air, or in the case of bearings applied to plant used in atomic work, any of the inert gases may be used. A very fine degree of filtration is applied to the gas, but very small particles may still escape the filter and cause subsequent problems through the electric current they may set up.

All forms of the apparatus are preferably fitted with suitable instruments to indicate the pressure drop through the nozzles. Such gauges may be calibrated to provide an indication of the velocities which are set up in accordance with well established formulae. Temperature indicators are also provided where required. An electronic meter or oscilloscope showing the amount of electricity passing through the conductor to ground or to shafting in ships may also be added.

The discharger is constructed in such a way that the complete unit can be easily removed from a pipe line or tank on which it is installed. This is important in that electro-chemical corrosion attack may take place in the discharger itself and in so doing it will have protected the bearings. The discharger blocks must therefore be easily exchanged and, if desired, dischargers can be arranged in parallel so that one can be taken out without interrupting the flow of oil in the main pipe.

Crude petroleum and semi-refined boiler oils and diesel fuels also give up amounts of charge in the same way as lubricants in bearings when accelerated through nozzles of injectors or burners. This sets up voltages which may lead to corrosion in bearings through which the charge passes on its way to ground. The electric currents generated when oil is burnt in boilers and gas turbines are reasonably steady as the oil flows through the nozzles without interruption. In the case of diesel engines, the current flows in pulses which corresponds to the oil injection into the cylinders.

For example, current is generated in the nozzles of a marine boiler. The current is conducted through the boiler, along the steam piping and to the turbine driving an alternator or a propeller on a ship. The current then crosses the oil-filled running clearances in the bearings and escapes down the shaft to the propeller, or by other routes into the sea. In an electric generating installation on land it passes into the alternator and escapes to ground through the ground connection from the alternator. The damage to the bearings is caused when the current crosses the running clearance.

In the case of diesel engines the current tends to pass into the cylinder walls, then into the pistons, down the connecting rods, across the running clearances in the large end bearings and so into the crankshaft from which the current escapes through the transmission to the propeller in the case of marine installation.

The current generated by the discharge of charged particles in diesel fuel as it is accelerated through the injectors is, in the case of diesel engines driving alternators on land, passed through the alternator to ground. If they are driving pumps, current passes into the pumps and to ground through the water or pipes conveying it. In each case the prolonged flow of current leads to corrosion at each running surface which the current traverses.

According to a further aspect of the present invention bearings are protected against damage by preventing the flow of current across the bearings, and this may be achieved in two ways. Firstly, a low resistance leakage path may be provided so as to conduct the stray current from an injector or burner directly to ground, so that it does not pass through any of the bearings. As an alternative method the desired protection can be achieved by preventing the production of current in the injector or burner by keeping the fuel out of contact with metallic surfaces after it has reached a point in its path where it is subjected to rapid accelerations. In effect, this means providing the burner or injector with an insulated portion at the nozzle orifice or orifices. The former of these two alternatives is the preferred one.

One method of achieving the desired result is to fit washers of high electrical conductivity immediately behind the nozzles of the burner or injector and to connect such washers, which are preferably made of copper, to a good conductor which provides a low resistance leakage path to ground. The result is that the current generated by the discharge of charged particles at the nozzle is led away out of the machinery. Stray currents from engine accessories such as electric heater plugs and sparking plugs also follow the low resistance discharge path. In land apparatus such good conductor would normally be led straight to a ground connection. On shipboard, however, the current has to be led into the sea, and this is usually done by passing it into the propeller shaft by means of a special conductor shoe. This method has the disadvantage in the case of ships that there is a risk of corrosion of the propellers. This risk is minimized by installing charge-absorbing electrolytic cells in the circuit of the leakage path. These cells are renewed or discharged when convenient.

Where there is not adequate room to fit a copper washer and conducting wire at the seatings of injectors and burners, the outside of the injector or burner body is coated with copper by electro-plating, brazing or like process. The conducting wire is then bonded directly on to a convenient place on the body of the injector. The threaded portion of the injector which fits the cylinder head may be given an insulating coating.

The second method is to prevent the discharge of the charged particles on a metallic surface at the point of atomisation. In this method the charged particles are carried forward from the nozzles into the combustion space and are swept out in the flue or exhaust gases of boilers or engines. To put this method into effect, the burners or injectors are provided with a moulded glass or ceramic material lining or an insulating inner coating for the nozzle body which is itself made of a metal of very low thermal expansion, so that it does not differ markedly from that of the ceramic lining. As an alternative to providing an insulating lining or coating for the orifice of the nozzle, an inner sleeve of a non-oxidising metal, likewise of low thermal expansion, is held in position by means of a glass or ceramic surround which holds the sleeve rigidly in the body of the nozzle. The sleeve can therefore be machined using normal metal working techniques to provide the desired profile. As will already be appreciated, the nozzle sleeve will be insulated by its glass or ceramic holder from the body of the burner or injector so that current cannot be generated in the nozzle to flow into the remainder of the structure and from there to the bearings.

I claim:

1. A method of protecting bearings of machinery from electro-chemical attack which results from the discharge of charged particulate contaminants in a dielectric lubricant liquid, said method comprising projecting said lubricant liquid against the surface of a conductive member at a position remote from the bearings to be protected and at a velocity such that the lubricant liquid striking the surface of the conductive member will have a velocity considerably in excess of the maximum velocity imparted to the liquid in the bearings, and grounding said conductive member through a conductive path other than through the bearings.

2. A method of discharging charged particulate contaminants suspended in dielectric lubricating liquid to decrease the tendency of the liquid to promote electro-chemical attack in service, said method comprising spraying the liquid against a grounded metallic conductor at a velocity such that the velocity of the liquid striking the plate will be considerably in excess of the maximum velocity to which the liquid will be subjected in bearings in service.

3. A method of conditioning dielectric lubricant liquid to decrease the tendency of said liquid to promote electro-chemical attack during service, which comprises passing the liquid around a closed circuit a plurality of times, and during said passage spraying the liquid against a grounded conductor at a velocity such that the velocity of the liquid striking the conductor will be considerably in excess of the maximum velocity to which the liquid would be subjected in bearings in service, the number of times the liquid is passed around the closed circuit being sufficient to completely discharge the charged particulate contaminant particles in the liquid.

4. A method of determining the corrosion potential of a dielectric lubricant liquid to promote electro-chemical attack on bearings from the discharge of suspended charged particulate contaminants during passage of said lubricant liquid through a bearing, which method comprises spraying the liquid against a grounded metallic test piece at a velocity such that the velocity of the liquid striking the test piece is considerably in excess of the maximum velocity to which the liquid will be subjected in bearings in service, said test piece having a surface of a soft metal which is rapidly marked by an oil having high corrosion potential.

References Cited by the Examiner
UNITED STATES PATENTS

| | | | |
|---|---|---|---|
| 940,429 | 11/09 | Chapman | 317—2 |
| 1,275,585 | 8/18 | Morgan | 317—2 |
| 2,035,732 | 3/36 | Vining | 317—2 |
| 2,256,118 | 9/41 | Kyropoulos | 317—2 |

OTHER REFERENCES

Static Electricity. U.S. Department of Commerce, National Bureau of Standards, Circular C438, the chapters on Grounding and Handling Petroleum Products, pages 11 to 13 and 16–17 respectively.

"Static Electricity in the Petroleum Industry," Electrical Engineering, vol. 77, No. 7, July 1958, pp. 610 to 614.

SAMUEL BERNSTEIN, *Primary Examiner.*

MAX L. LEVY, *Examiner.*